Patented Dec. 23, 1952

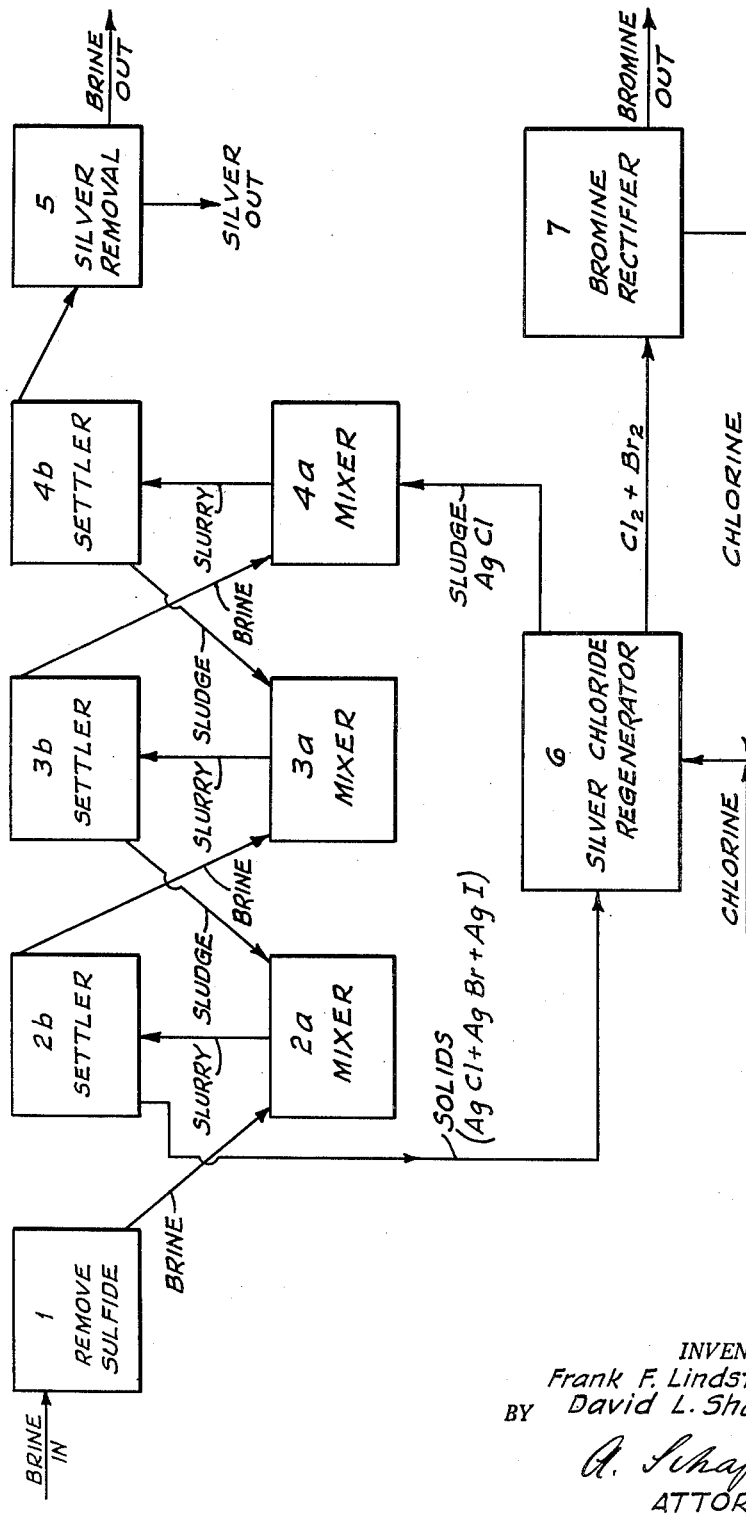

2,622,966

UNITED STATES PATENT OFFICE 2,622,966

PROCESS OF REMOVING BROMINE FROM BRINE

Frank F. Lindstaedt and David L. Shatto, San Anselmo, Calif.

Application April 28, 1950, Serial No. 158,886

3 Claims. (Cl. 23—217)

The present invention relates to a new and useful process of removing bromine from brine containing considerable sodium chloride and sodium carbonate, of the type found at Searles Lake, a salt marsh in San Bernardino County, California. This brine contains approximately:

| | Pounds per gallon |
|---|---|
| Sodium chloride | 1.787 |
| Sodium sulphate | .739 |
| Sodium carbonate | .52 |
| Potassium chloride | .522 |
| Sodium bromide | .109 |
| Sodium iodide | .0014 |
| Sodium borate | .164 |
| Tri-sodium phosphate | .016 | as well as other minor salts.

It has been heretofore proposed, for the removal of iodine from brine of relatively light concentration, to add a silver salt such as silver nitrate to the brine in an amount theoretically sufficient to just combine with all the iodine present. We have found that when operating in this manner on Searles Lake brine, and for the removal of bromine, on adding silver chloride or nitrate approximately equivalent theoretically to the bromine present, only part of the bromine is removed, and that a considerable excess of the silver salt is necessary to remove an economic part of the bromine.

The following experiment showed that one equivalent of silver nitrate will not remove an economic part of the bromine from Searles Lake brine.

4½ ml. 10% w./v. AgNO₃, which was equivalent to the contained bromide, was added to 200 ml. sulfide-free brine during one minute of agitation. Only 29% of the bromide was removed. An additional 6 ml. 5% w./v. AgNO₃, which was equivalent to the remaining bromide, was added during one minute of agitation. This time 39% of the remaining bromide was removed. This is far short of one equivalent of bromide for one equivalent of silver nitrate. Further, the conversion of silver bromide to silver nitrate is more than ten times as expensive as converting to the chloride.

The following experiments showed further that considerable excess silver is necessary to remove an economic quantity of bromide from this brine:

About 0.635 gm. silver as the chloride was agitated with 200 ml. brine containing about 0.1% bromide ion for five minutes to remove sulfide and other substances easily removed. The brine was filtered and another equal quantity of silver chloride was added and the slurry agitated for 30 minutes. Only 55% of the bromide was removed. A third similar amount of silver chloride, similarly treated, removed another 13%, making a total of 68% removed. More than four and a half times the chemical equivalent silver chloride had been used, exclusive of the first portion and still 32% of the original bromide remained.

In another experiment, 0.635 gm. silver as chloride was agitated with 200 ml. brine for 16 hours. 43% of the bromide remained in the brine. The silver used was 2.35 times the chemical equivalent. This represented about 24.5% of the silver chloride being converted to bromide.

In another experiment, 0.952 gm. silver as chloride was agitated for one hour with 25 ml. brine. This was 30 times the chemical equivalent of silver to bromide. 11% of the original bromide remained in the brine.

These experiments indicate that the conversion of silver chloride into the bromide is only a surface reaction, and that with the type of curd formed when silver chloride is added to the brine, only about 25% is converted to the bromide.

The chloride and the bromide of silver are known to form isomorphic crystals, and the phenomenon observed in the above experiments may be explained by noting the volume change of the solids in the reaction. The molecular volumes are calculated by dividing the molecular weights by the respective densities, as follows:

| | | Ml. |
|---|---|---|
| AgCl | 143.34/5.56 | 26.0 |
| AgBr | 187.80/6.473 | 29.65 |

We see that as silver chloride is converted to the bromide, there is an increase in volume of the solid particles, with the unreacted chloride at the center. Any system that will make or maintain finer particles or produce more surface will allow the reaction to proceed farther or faster.

The following experiments show that the addition of reagents which prevent growth of silver chloride crystals or its curdling also allow the reaction to go farther. In these the growth-preventing agents were mixed with 100 ml. brine and 4 ml. silver nitrate, 10% w./v. added and the mixture agitated 15 minutes, with the following results:

| Growth-preventing agent: | Bromide removed, percent |
|---|---|
| (1) No reagent | 44 |
| (2) "Calgon," a polyphosphate, ½% | 56.3 |
| (3) Dextrin, ½% | 64 |
| (4) Gelatin, 1¼% | 69.5 |

These reagents maintained various degrees of dispersion with consequent higher extraction and will be referred to in the claims as deflocculating agents.

In our preferred process, we agitate the brine with silver chloride in large excess in a countercurrent slurry, to form as much silver bromide as will, in a reasonable time, separate the solids, then regenerate the silver chloride by reacting with a reagent such as chlorine or one which will liberate chlorine from chloride ion, separate the liberated bromine, and return the silver chloride, as illustrated in flow sheet Figure 1, of the drawing accompanying the specification.

Block 1 is any apparatus or process suitable to remove sulfide and other objectionable substances from the brine. The system 2a, 2b, 3a, 3b, 4a, 4b, is any slurry agitator system. Block 5 is any suitable apparatus or process to remove dissolved silver from the brine and return it to the process. Block 6 is an apparatus in which the slurry containing silver bromide is treated to regenerate silver chloride. Block 7 is a rectifier to separate bromine from excess regenerating agent.

In the preferred form of our invention brine flows through the plant, first through block 1, then successively through 2a, 2b, 3a, 3b, 4a, 4b, then 5 and out of the plant. Meanwhile, silver chloride slurry flows through 4a, 4b, 3a, 3b, 2a, 2b, is filtered free from brine and is regenerated in block 6, then goes back to 4a and is re-cycled. The bromine is rectified in block 7 and taken out of the plant while the recovered chlorine goes back to the regenerator.

The reaction in the slurry in the brine is:

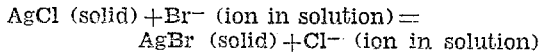

$$AgCl\ (solid) + Br^- \ (ion\ in\ solution) =$$
$$AgBr\ (solid) + Cl^- \ (ion\ in\ solution)$$

and takes place essentially at the surface of the individual crystals, and is inhibited from going to completion due to the volume change described above.

The reaction in the regenerator (6) is:

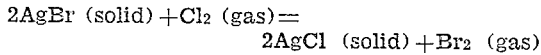

$$2AgBr\ (solid) + Cl_2\ (gas) =$$
$$2AgCl\ (solid) + Br_2\ (gas)$$

The action of rectifier (7) is essentially purification. A mixture of chlorine and bromine may be separated into the components by distillation or selective absorption.

In the above-described process a suitable amount of deflocculating agent may be added, although the main feature of the invention is the slurrying of the brine with an excess amount of silver chloride. Just how great the excess should be depends upon results desired and possibly economic considerations, but we find that an excess equal to approximately 10 times the theoretical amount sufficient to combine with all the bromide present gives satisfactory results, although a much greater excess may be used.

We claim:

1. A process of producing bromine from Searles Lake brine containing bromides which comprises first removing sulfide from the brine to obtain a substantially sulfide free brine, adding silver chloride to the sulfide free brine at least 4½ times in excess of the stoichiometric equivalent of bromide ion in the brine to form a mixture, agitating the mixture to form a slurry containing precipitated silver chloride and silver bromide, removing the solid portion from the slurry, treating the removed precipitated silver chloride and silver bromide with chlorine gas to chemically decompose the silver bromide portion obtaining a product consisting substantially of silver chloride and simultaneously producing an effluent gas consisting of bromine and chlorine, separately removing the silver chloride, and chlorine and bromine gases from the decomposed composition, chemically treating the chlorine and bromine gases to separate the two elements, removing the bromine and recycling the chlorine for treatment of additionally formed precipitated silver chloride and silver bromide in a cyclic process.

2. A process as defined in and by claim 1 in which the amount of added silver chloride is 4½ to 30 times in excess of the stoichiometrical equivalent of bromide ion contained in the brine.

3. A process of producing bromine from Searles Lake brine containing bromides which comprises first removing sulfide from the brine to obtain a substantially sulfide free brine, adding silver chloride to the sulfide free brine at least 4½ times in excess of the stoichiometric equivalent of bromide ion in the brine to form a mixture, agitating the mixture in a first mixer to form a slurry containing precipitated silver chloride and silver bromide, allowing in a first settler the formed slurry to settle, passing the effluent liquid to a second mixer to further agitate the same to form more precipitated silver chloride and silver bromide, allowing the further mixed slurry to settle in a second settler, passing the solid silver chloride and silver bromide from the second settler back to the first mixer where it is further mixed with the fresh sulfide free brine and additional silver chloride, removing the solid portion from the first settler, treating the removed precipitated silver chloride and silver bromide with chlorine gas to chemically decompose the silver bromide portion obtaining a product consisting substantially of silver chloride and simultaneously producing an effluent gas consisting of bromine and chlorine, separately removing the silver chloride, and chlorine and bromine gases from the decomposed composition, passing the silver chloride sludge to the second mixer where it is agitated with the effluent liquid from the first settler, passing the chlorine and bromine gases to a rectifier to separate the two elements, removing the bromine and recycling the chlorine for treatment of additionally formed precipitated silver chloride and silver bromide in a cyclic process.

FRANK F. LINDSTAEDT.
DAVID L. SHATTO.

REFERENCES CITED

The following references are of record in the file of this patent:

UNITED STATES PATENTS

| Number | Name | Date |
|---|---|---|
| 1,350,089 | Wrenkle et al. | Aug. 17, 1920 |
| 1,837,777 | Jones | Dec. 22, 1931 |
| 1,921,563 | Cottrell | Aug. 8, 1933 |
| 1,921,564 | Cottrell | Aug. 8, 1933 |
| 1,927,663 | Jones | Sept. 19, 1933 |

OTHER REFERENCES

Funk & Wagnall's "Standard Dictionary," One volume edition, 1929, page 2299, Funk & Wagnall Co., N. Y.

Webster's Unabridged Dictionary, 1941 Ed., page 2371, G. & C. Merriam Co., Springfield, Mass.

J. W. Mellor's "Comprehensive Treatise on Inorganic and Theoretical Chemistry," vol. 2, page 17; vol. 3, page 424; Longmans, Green & Co., N. Y.